United States Patent
Enescu et al.

(10) Patent No.: US 10,153,817 B2
(45) Date of Patent: Dec. 11, 2018

(54) COMPLEXITY REDUCTION FOR TRANSMITTER PRECODING

(71) Applicant: NXP USA, Inc., Austin, TX (US)

(72) Inventors: Andrei Alexandru Enescu, Bucharest (RO); Victor-Florin Crasmariu, Bucharest (RO); Marius Octavian Arvinte, Focsani (RO)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 15/411,068

(22) Filed: Jan. 20, 2017

(65) Prior Publication Data
US 2018/0115350 A1  Apr. 26, 2018

(30) Foreign Application Priority Data
Oct. 25, 2016 (RO) .............................. A201600753

(51) Int. Cl.
| | |
|---|---|
| *H04B 7/0456* | (2017.01) |
| *H04B 7/0417* | (2017.01) |
| *H04L 1/00* | (2006.01) |
| *H04B 7/0452* | (2017.01) |
| *H04B 7/06* | (2006.01) |

(52) U.S. Cl.
CPC ......... *H04B 7/0456* (2013.01); *H04B 7/0417* (2013.01); *H04B 7/0452* (2013.01); *H04B 7/0634* (2013.01); *H04L 1/0013* (2013.01); *H04L 1/0015* (2013.01)

(58) Field of Classification Search
CPC .. H04B 7/0417; H04B 7/0452; H04B 7/0456; H04B 7/0639; H04B 7/0634; H04L 1/0013; H04L 1/0015
USPC ................................ 375/267, 299, 295, 347
See application file for complete search history.

(56) References Cited

U.S. PATENT DOCUMENTS

| | | | | |
|---|---|---|---|---|
| 2007/0115799 | A1* | 5/2007 | Ting | H04B 7/0417 370/208 |
| 2008/0317141 | A1* | 12/2008 | Burg | H04B 7/0854 375/260 |
| 2011/0274002 | A1 | 11/2011 | Pare et al. | |
| 2011/0274003 | A1* | 11/2011 | Pare, Jr. | H04B 7/0452 370/252 |
| 2014/0269880 | A1* | 9/2014 | de Victoria | H04L 1/0038 375/231 |

* cited by examiner

*Primary Examiner* — Leila Malek

(57) ABSTRACT

A transmitter includes a plurality of user-specific channels, with each user specific channel associated with a different set of user equipment (UE) receive antennas. For precoding, the transmitter generates a baseline channel matrix reflecting the characteristics of the communication medium employed to transmit data to the different user equipment (UEs). For each user-specific channel, the transmitter generates a complementary channel matrix based on the baseline channel matrix, then performs matrix decomposition (e.g., QR-Givens decomposition) to eliminate selected terms of the complementary channel matrix that interfere from other communication channels of the transmitter.

19 Claims, 4 Drawing Sheets

$$\underset{201}{\tilde{H}_2^H} = \underset{202}{\begin{bmatrix} H_1^H \\ H_3^H \end{bmatrix}} = [\underset{203}{q_1}\ q_2\ q_3\ \underset{210}{q_4}\ \underset{211}{q_5}\ q_6] \underset{204}{\begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \\ \hline 0 & 0 & 0 & 0 \\ 0 & 0 & 0 & 0 \end{bmatrix}}$$

FIG. 2

$$\cdot T_{ij} = \begin{bmatrix} 1 & \cdots & 0 & \cdots & \overset{320}{0} & \cdots & 0 \\ \vdots & \ddots & \vdots & \cdots & \vdots & \cdots & \vdots \\ 0 & \cdots & c_{ii} & \cdots & s_{ij} & \cdots & 0 \\ \vdots & \cdots & \vdots & \ddots & \vdots & \cdots & \vdots \\ 0 & \cdots & -s_{ij}^* & \cdots & c_{ii}^* & \cdots & 0 \\ \vdots & \cdots & \vdots & \cdots & \vdots & \ddots & \vdots \\ 0 & \cdots & 0 & \cdots & 0 & \cdots & 1 \end{bmatrix}$$

FIG. 3

COMPLEXITY REDUCTION FOR TRANSMITTER PRECODING

BACKGROUND

Field of the Disclosure

The present disclosure relates generally to data communication and more particularly relates to data transmitters.

Description of the Related Art

Communication networks typically employ transmitters to communicate information to endpoints of the network. For example, cellular networks employ base stations to communicate data from the network infrastructure to user equipment (e.g., mobile handsets). To facilitate more reliable and efficient communication, the base stations sometimes use multiple-input multiple-output (MIMO) transmitters to take advantage of communication features such as multipath propagation. The MIMO transmitter includes multiple communication channels, with each channel transmitting data to a corresponding user equipment. To reduce the communication overhead at the user equipment, the MIMO transmitter typically precodes data prior to transmission via a communication channel. In particular, precoding can adjust the data to be transmitted in order to account for interference from data being concurrently communicated via other channels of the MIMO transmitter. However, conventional precoding typically demands generation of multiple complex matrices to generate a null space used to adjust the data to be transmitted, negatively impacting the processing efficiency and power consumption of the MIMO transmitter.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 2 is a diagram illustrating an example of unused portions of precoding matrices for the transmitter of FIG. 1 in accordance with at least one embodiment.

FIG. 3 is a diagram illustrating portions of a rotational matrix used to generate portions of a precoding matrix in accordance with at least one embodiment.

DETAILED DESCRIPTION

FIGS. 1-5 illustrate techniques for generating precoding matrices sets for a communication channel of a transmitter, such as a multi-user (MU) MIMO transmitter of a cellular communications network. The transmitter includes a plurality of user-specific channels, with each user specific channel associated with a different set of user equipment (UE) receive antennas. For precoding, the transmitter generates a baseline channel matrix reflecting the characteristics of the communication medium employed to transmit data to the different user equipment (UEs). For each user-specific channel, the transmitter generates a complementary channel matrix based on the baseline channel matrix, then performs matrix decomposition (e.g., QR-Givens decomposition) to eliminate selected terms of the complementary channel matrix that interfere from other communication channels of the transmitter. To perform the matrix decomposition, the transmitter generates a set of rotational matrices, then iteratively multiplies subsets of each rotational matrix in the set to generate a final precoding matrix. By using only a subset, rather than all, of each rotational matrix during each iteration, the transmitter effectively eliminates terms of the decomposed matrices that are not useful for precoding. The elimination of these terms reduces the overall number of calculations needed to perform the matrix decomposition, thereby reducing power consumption and improving processing efficiency at the transmitter.

Figure 1:
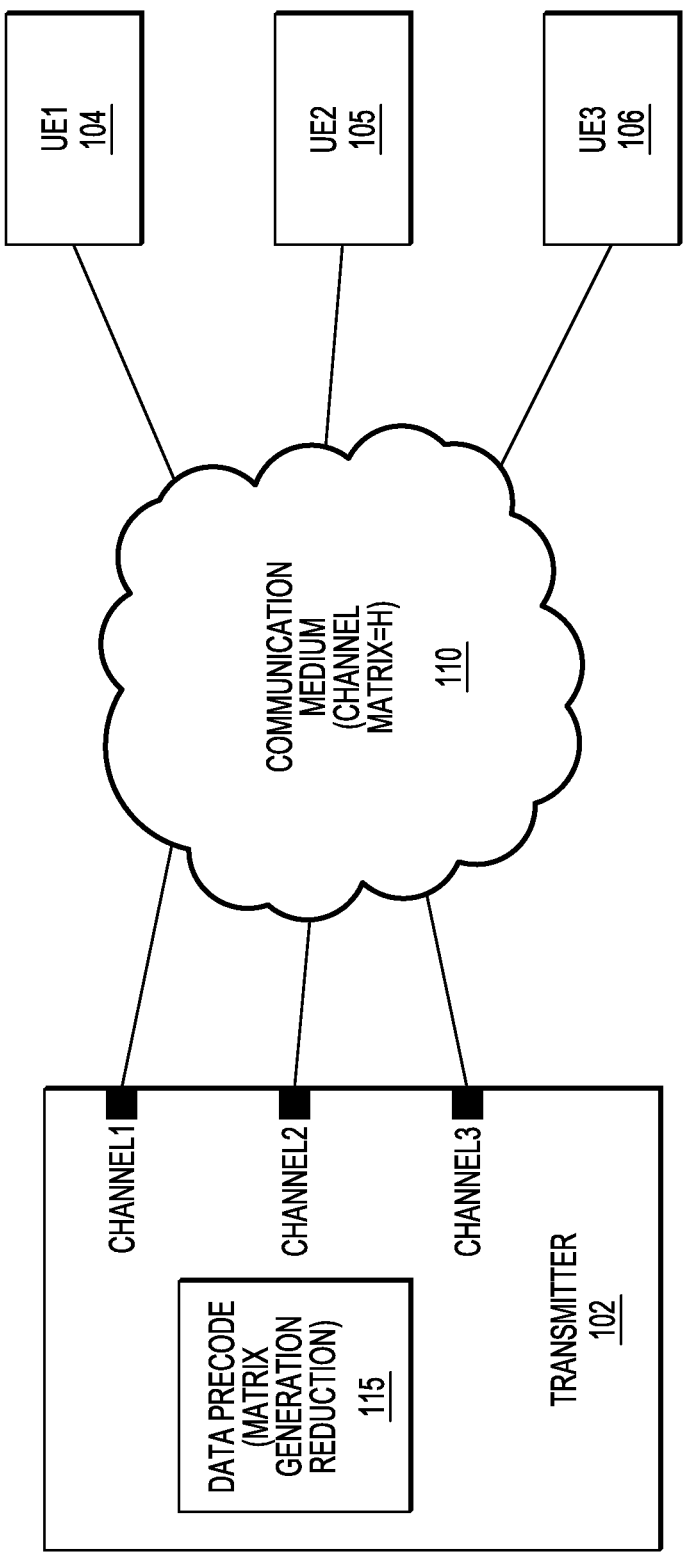
FIG. 1 is a block diagram of a communication network that employs a transmitter configured to generate partial precoding matrices to reduce computations in accordance with at least one embodiment.

FIG. 1 illustrates a block diagram of a portion of a communications network 100 including a transmitter 102, user equipment (UEs) 104, 105, and 106, and a communication medium 110. For purposes of description, it is assumed that the communications network 100 is a telecommunications network, such as a Long-Term Evolution (LTE) wireless communication network or a WiFi network that complies with an 802.11xx network standard. It is further assumed that the transmitter 102 is a multi-user multiple-input multiple output (MU MIMO) transmitter incorporated in or co-located with a base station, such as an Evolved Node B (eNodeB) of an LTE network, and that the UEs 104-106 are each mobile handsets, such as compute-enabled mobile phones. In other embodiments, the transmitter 102 is incorporated or col-located with a wireless router device. However, it will be appreciated that the techniques described herein can apply to different types of transmitters, different types of networks, and different types of user equipment, as well as different combinations thereof. Moreover, it is assumed that the communication medium 110 is a communication medium that physically transfers of signals between the transmitter 102 and the UEs 104-106, such as air, but that the techniques described herein can apply to different types of communication media.

As indicated above, the transmitter 102 is a MU MIMO transmitter generally configured to receive data from another portion (not shown) of the network, the data representing information individually targeted to different ones of the UEs 104-106. The transmitter 102 negotiates with each of the UEs 104 to 106 to establish user-specific communication channels (referred to herein as channels) with each UE, and communicates data to each of the UEs 104-106 over the corresponding channel and via the communication medium 110. Thus, in the illustrated example, the transmitter 102 establishes three communication channels, designated CHANNEL1, CHANNEL2, and CHANNEL3, to communicate data to UE 104, UE 105, and UE 106, respectively. In at least one embodiment, each channel includes, at least in part, corresponding physical equipment to facilitate the communication of data to its corresponding UE. For example, the transmitter 102 includes a plurality of antennas (not shown at FIG. 1) to send data over the communication medium 110, with each channel including multiple ones of the plurality of antennas. For example, in at least one embodiment each channel includes at least two antennas to communicate data, thereby supporting more reliable communication with the UEs 104-106.

In at least one embodiment, the transmitter 102 is configured to communicate data via the channels concurrently. This concurrent transmission of data via different channels can cause cross-channel interference, reducing the reliability of the communicated data. Further, reduction of the cross-channel interference is based on the state of each communication channel. Therefore, it is difficult to reduce such cross-channel interference at the UEs 104-106 themselves, as each individual UE is not aware of the state of the communication channels corresponding to the other UEs. Accordingly, to reduce cross-channel interference, the transmitter 102 includes a data precode module 115 generally configured to precode the received data for transmission. In particular, the data precode module is configured to adjust the data to be transmitted to account for how the data is likely to be affected by cross channel interference, as well as other characteristics of the communication medium 110.

To illustrate, the data precode module 115 is generally configured to determine a baseline channel matrix, designated channel matrix H, for the communication medium 110. The channel matrix H reflects characteristics of the communication medium 110, including characteristics resulting from cross-channel interference, and in particular the effect of the communication medium 110 on transmitted signals. The data received at the UEs 104-106 is given by the following formula:

$$r = H * x + n$$

where r is the matrix of received data, H is the channel matrix, x is the vector of data being transmitted, and n represents a vector containing noise samples associated with the communication medium 110.

In at least one embodiment, the data precode module 115 determines the channel matrix H by sending one or more test signals to the UEs 104-106 via each of the communication channels, receiving responsive test information from each of the UEs 104-106, and generating the channel matrix H based on the responsive test information using one or more conventional techniques. In at least one other embodiment, the data precode module 115 estimates the channel matrix H based on stored characteristics of the communication medium. In still another embodiment, the data precode module 115 generates the channel matrix H based on a combination of stored characteristics and test results from transmission of one or more test signals.

For each channel, the data precode module 115 generates a user-specific channel complementary matrix, referred to herein as an individual channel matrix, based on the baseline channel matrix H. In at least one embodiment, the data precode module 115 generates the individual channel matrix. The individual channel matrix (also termed complementary channel matrix) is generated once for each user by removing from the global channel matrix H the columns (or lines, depending on the used model) corresponding to the respective channel.

The individual channel matrix for a channel represent interference paths, indicating how the data targeted to the corresponding UE will interfere with data targeted to the other UEs. Accordingly, for each channel the data precode module 115 performs a matrix decomposition to set these matrix terms to zero. The resulting matrix, when multiplied by the data to be transmitted via the channel, effectively reduces the effects of cross-channel interference on the data, so that the data can be more easily and reliably decoded at the corresponding UE. In particular, the precoding matrix (P) used to precode the data must satisfy the following formula:

$$H_i * P_{j,k} = 0, i \neq j$$

where $H_i$ is the individual channel matrix. Accordingly, the precoding matrix P can be generated by selecting P from the null space of the individual channel matrix. In particular, P is selected by performing a matrix decomposition of the individual channel matrix to select the null space.

In at least one embodiment, to perform the matrix decomposition, the data precode module 115 employs a QR decomposition process, such as a Givens rotation method, wherein it generates a set of rotational matrices, each matrix in the set designated as a matrix T. As described further herein, the data precode module 115 iteratively multiplies a subset of the terms of each T matrix to generate a combined matrix, designated Q. The data precode module 115 then multiplies the Q matrix and the individual channel matrix to zero out the interference terms, multiplies the resulting matrix with the data to be transmitted, thereby precoding the data. The transmitter 102 then transmits the precoded data via the associated communication channel to the corresponding UE.

By computing only a subset of columns of the Q matrix, the precode module 115 iteratively eliminates terms of the Q matrices that are not useful for precoding. In particular, under a conventional QR decomposition process, the null space matrix (a subset of the orthogonal matrix Q) has, in many situations, more column vectors than are needed to precode the data. For example, in a scenario wherein the transmitter 102 is to transmit two communication streams to a UE over a given channel, only two column vectors of the null space of the Q matrix are required for precoding. However, a conventional QR decomposition process will generate a Q matrix whose null space has more than the necessary number of column vectors. This can be better understood with reference to FIG. 2, which illustrates an example decomposition of an individual channel matrix 201, designated $\tilde{H}_2^H$, for CHANNEL2 of the transmitter 102. As illustrated, the individual channel matrix 201 can be represented as matrix 202, corresponding to the terms of the baseline channel matrix for CHANNEL1 and CHANNEL3. That is, the individual channel matrix 201 for CHANNEL2 is formed by removing the column vectors corresponding to CHANNEL2 from the baseline channel matrix H.

In the depicted example, the user-specific complementary channel matrix 201 is decomposed into a Q matrix 203 and an R matrix 204. Thus, the Q matrix itself is based on and representative of the characteristics of the transmitter 102, and in particular based on the particular characteristics of the channels used by the transmitter 102 to communicate data to user equipment. That is, the Q matrix is a set of values representing physical characteristics of the transmitter 102. To precode the data for CHANNEL2, the data precode module 115 can form the precode matrix P from the null space for the complementary channel matrix 201, as derived from Q matrix. The precode matrix P is formed from the selected column vectors of the Q matrix for all of the channels of the transmitter 102, which precodes the data for each channel by multiplying the data by the precode matrix P. In the example of FIG. 2, the null space of the Q matrix is formed by two vectors 210 and 211 (designated $q_5$ and $q_6$, respectively). However, only one column vector of the Q matrix, such as column vector 210, is needed to form the precode matrix P. That is, only one column vector of the Q matrix is needed to zero out, for CHANNEL2, the interference terms resulting from the transmission of data to the UE. Conventionally, a transmitter would calculate all of the vectors for the Q matrix 203 for matrix decomposition and precoding, consuming a large amount of transmitter resources. In contrast, as described further herein, the precode module 115 calculates only those terms of the Q matrix that are needed to extract a specific number of column vectors of the null space needed for precoding, which is a subset or partition of the Q matrix. The number of column vectors corresponds to the number of data streams to be communicated to the corresponding UE. By calculating only the terms necessary to extract the required column vectors, the precode module reduces the demand on resources of the transmitter 102 for precoding, thereby conserving power and improving processing efficiency.

It will be appreciated that the example of FIG. 2 is applicable to a transmitter having three channels, and that in other embodiments including transmitters with different channels, the number of vectors of the Q matrix needed for decomposition can be different for different number of channels of the transmitter and different numbers of UEs to which the transmitter is communicating data. In particular, assuming:

$$N_t = m_i + \sum_{i=1}^{N} N_{r,i}$$

where $N_t$ is the number of transmit antennas of the transmitter 102 and $N_{r,i}$ is the number of receive antennas at the ith UE, $m_i$ indicates the number of vectors (e.g., columns) of the Q matrix that do not need to be calculated for the ith UE.

Returning to FIG. 1, to calculate the portions of the Q matrix needed to extract the relevant null space for a given channel, in at least one embodiment the precode module employs a Givens rotation process. In particular, the precode module 115 proceeds by calculating the set of T matrices according to conventional rotational matrix generation techniques. The T matrices are generated in order, with matrix $T_{21}$ generated first, followed by T matrix $T_{31}$, and so on through T matrix $T_{64}$. An example of the ijth iteration of the T matrix is illustrated at FIG. 3 as matrix 320.

The precode module 115 initializes the Q matrix for the channel to the identity matrix I. Beginning with the final T matrix and proceeding in reverse order to the first T matrix, the precode module 115 iteratively generates terms of the Q matrix according to the following formulas:

$$Q_{i,l}(n) = c^*_{i,j} Q_{i,l}(n-1) - s_{i,j} Q_{j,l}(n-1)$$

$$Q_{j,l}(n) = s^*_{i,j} Q_{i,l}(n-1) - c_{i,j} Q_{j,l}(n-1)$$

$$Q_{p,l}(n) = Q_{p,l}(n-1), p \neq i, j$$

Where c, s, c*, and s* are terms of the corresponding T matrix as illustrated at FIG. 3. The generated terms of the Q matrix are collectively referred to herein as a partial Q matrix to indicate that they include some, but not all, of the terms of the Q matrix under a conventional Givens QR matrix decomposition. The precode module 115 then extracts the null space from the partial Q matrix to form the precode matrix P, and multiplies the matrix P and the data to be transmitted via the channel to generate the precoded data for the channel. The transmitter 102 transmits the precoded data via the channel to the corresponding UE.

In at least one embodiment, the precode module 115 employs a Householder matrix decomposition technique rather than a Givens rotation technique. In particular, the precode module 115 generates an initial R matrix according to a conventional Householder technique. For each column of the R matrix, starting at column 1 and proceeding through column N, the precode module 115 generates a transformation designated $H_j$, according to a conventional Householder decomposition technique, where j is the corresponding column. The precode module 115 applies the transform to the column of the R matrix according to the following formula:

$$R_j = H_j^* R_{j-1}$$

The precode module then sets the initial Q matrix for the channel to the identity matrix I. For select columns t the precode module 115 generates the terms of the Q matrix according to the following formula:

$$\text{For } n=N:1, Q(n) = H_n^H Q(n-1)$$

In at least one embodiment, any of the columns of the null space set of the Q matrix can be selected for generation, as long as the requisite number of column vectors for the null space set are generated.

The generated terms of the Q matrix are collectively referred to herein as a partial Q matrix to indicate that they include some, but not all, of the terms of the Q matrix under a conventional QR matrix decomposition. The precode module 115 then extracts the null space from the partial Q matrix for each channel to form the precode matrix P, and multiplies the matrix P and the matrix of data, representing the all of the data to be transmitted over all the channels of the transmitter 102, each channel via the channel to generate the precoded data for the channel. The transmitter 102 transmits the precoded data via the channels to the corresponding UEs.

Figure 4:
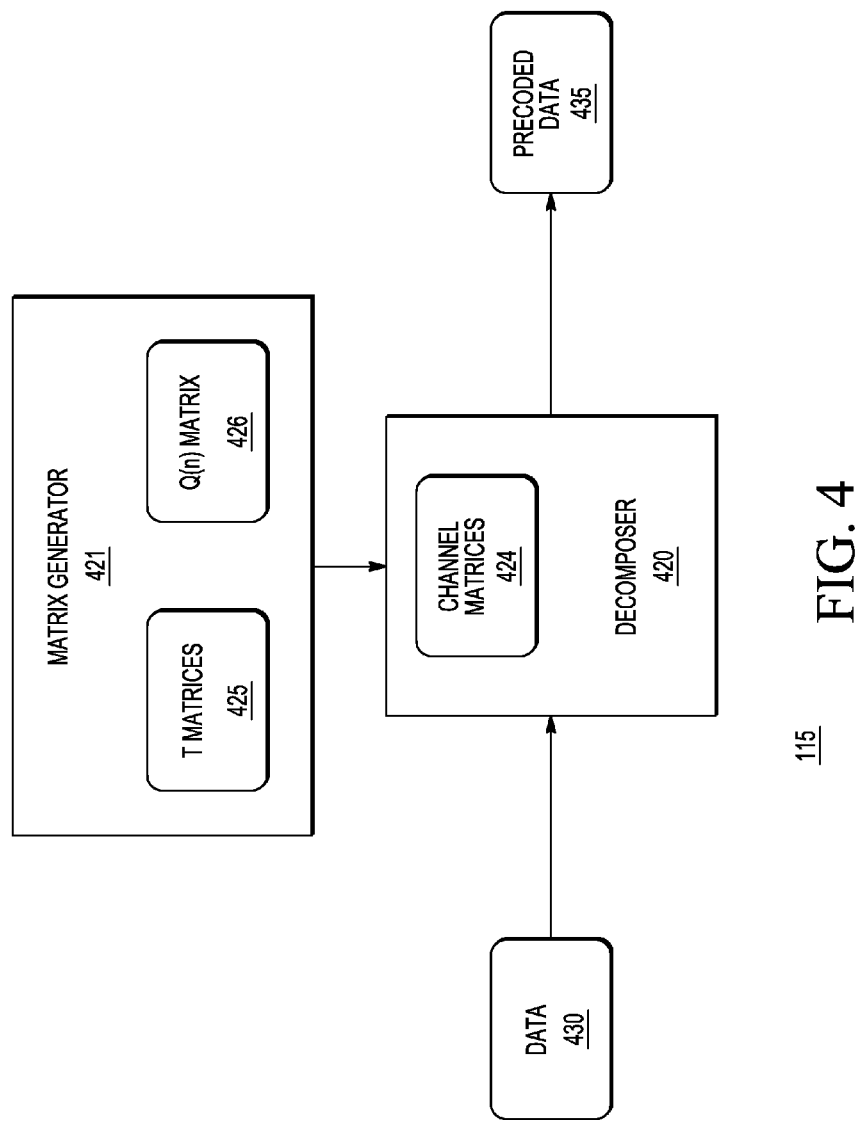
FIG. 4 is a block diagram of the data precode module of the transmitter of FIG. 1 in accordance with at least one embodiment.

FIG. 4 illustrates a block diagram of the precode module 115 in accordance with at least one embodiment. In the illustrated example, the precode module 115 includes a decomposer 420 and a matrix generator 421. The decomposer 420 includes circuitry generally configured to generate individual channel matrices 424 for each channel of the transmitter 102. The decomposer 420 receives data 430 for communication via on of the channels, and decomposes the corresponding channel matrix 424 using a QR decomposition process to generate precoded data 435. In particular, the decomposer 420 decomposes the channel matrix 424 based on a partial Q matrix generated using, for a Givens QR decomposition process, a set of rotational matrices T 425 generated by the matrix generator 421. In other embodiments, the decomposer 420 can employ a different QR decomposition process, such as a Householder decomposition process, and employ corresponding matrices in place of the T matrix set 425. For purposes of description, the embodiment of FIG. 4 will be described with respect to a Givens QR decomposition process.

The matrix generator 421 is generally configured to calculate the T matrix set 425 according to a conventional Givens matrix decomposition technique. The matrix generator 421 then generates terms of an Q(n) matrix 426 according to the formulas set forth above with respect to FIG. 1, thus generating a partial Q matrix as described above. Because the matrix generator 421 generates only a partial Q matrix, rather than all the terms of a Q matrix according to a conventional matrix decomposition technique, the matrix generator 421 is able to reduce the processing demands at the transmitter 102, conserving power and improving processing efficiency. The matrix generator 421 provides the partial Q matrix to the decomposer 420, which extracts the null space from the partial Q matrix to generate the precode matrix P, then multiplies the precode matrix and the data 430 to generate the precoded data 435.

Figure 5:
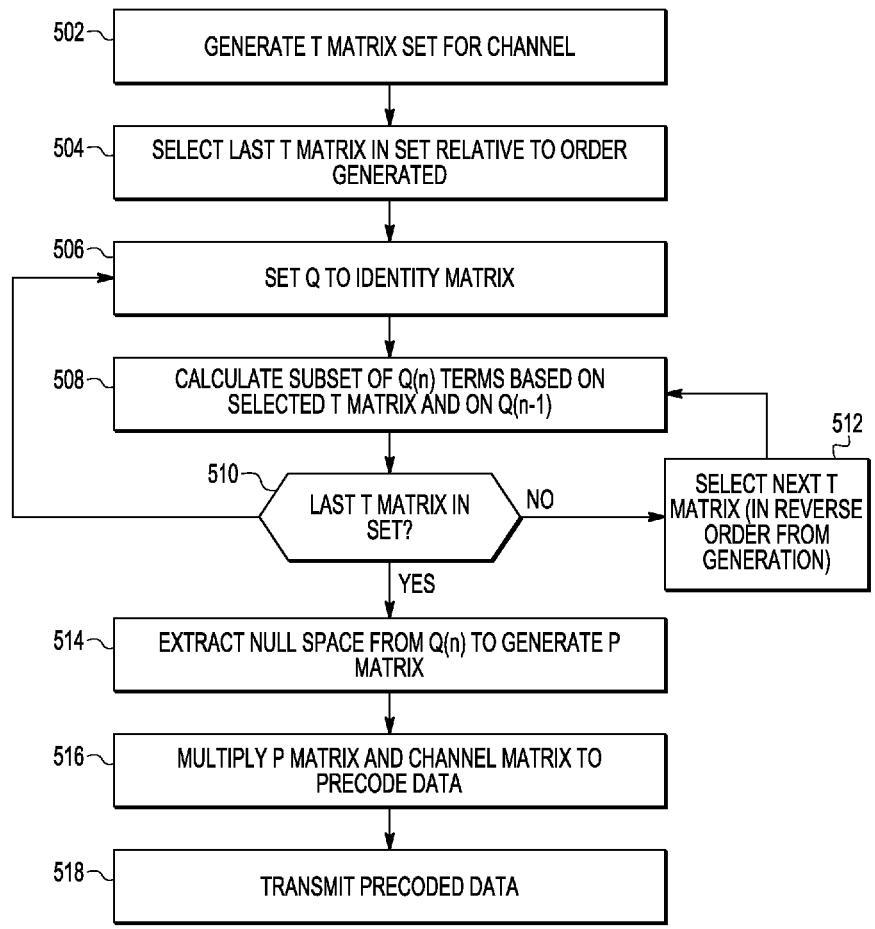
FIG. 5 is a flow diagram of a method of reusing precoding matrices for different communication channels in accordance with at least one embodiment.

FIG. 5 is a flow diagram of a method 500 of precoding data at a transmitter by generating only partial Q matrices for QR decomposition in accordance with at least one embodiment. At block 502, the precode module 115 generates a set of T (rotational) matrices for a channel based on a conventional rotational matrix generation process, such as a Givens decomposition process. The precode module 115 generates the matrices in an order governed by the decomposition process. At block 504, the precode module 115 selects the last T matrix in the set of T matrices, relative to the order in which the T matrices were generated. At block 506, the precode module 115 sets the Q (orthogonal) matrix for the channel to an initial value, corresponding to the identity matrix I.

At block 508, the precode module 115 calculates the next iteration of the partial Q matrix, designated Q(n), by calculating selected terms based on the selected T matrix and on Q(n−1), according to the formula set forth above with respect to FIG. 1 for Givens decomposition. At block 510, the precode module 115 determines whether the currently selected T matrix is the last T matrix in the set (that is, the first T matrix generated). If not, the method flow moves to block 512 and the precode module 115 selects the next T matrix in the set, in reverse order from the order in which the T matrices were generated at block 502. The method flow returns to block 508 for calculation of the next iteration of the partial Q matrix.

Returning to block 510, if the selected T matrix is the last T matrix in the set, the method flow proceeds to block 514 and the precode module 115 extracts the null space from the partial Q matrix Q(n), according to a conventional null space extraction technique, thereby forming the precode matrix P. At block 516, the precode module 115 multiplies the P matrix and the data to cancel out the terms associated with interference from other channels of the transmitter 102, thereby generating precoded data. At block 518, the transmitter 102 transmits the precoded data via the channel to the corresponding UE.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
for a first channel of a transmitter device including a plurality of channels, the first channel to transmit a plurality of data streams to a corresponding user equipment, generating, at precode circuitry, a first partial precoding matrix, the generating comprising:
generating only a subset of column vectors of a Q matrix for QR decomposition, the Q matrix based on characteristics of at least one of the plurality of channels, wherein the number of column vectors in the subset corresponds to a number of data streams to be transmitted to the corresponding user equipment via the first channel, wherein generating only the subset of column vectors eliminates terms of the Q matrix that interfere from other channels of the transmitter device for QR decomposition;
generating the first partial precoding matrix based on the subset of column vectors of the Q matrix;
precoding, based on decomposition of the first partial precoding matrix, first data for transmission via the first channel; and
transmitting the first precoded data via the number of data streams corresponding to the number of column vectors in the subset of column vectors via the first channel at the transmitter device.

2. The method of claim 1, wherein generating the subset of column vectors of the Q matrix comprises generating the subset of column vectors from a null space of the Q matrix.

3. The method of claim 1, wherein generating the subset of column vectors comprises:
generating a first set of rotational matrices based on a first channel matrix for the first channel; and
iteratively multiplying rotational matrices of the first set of rotational matrices to generate the subset of columns, wherein each iteration comprises multiplying only a subset of terms of each of the rotational matrices.

4. The method of claim 3, wherein iteratively multiplying the rotational matrices comprises multiplying the rotational matrices to generate a number of columns for the Q matrix, the number of columns based on a number of antennas associated with the first channel of the transmitter device.

5. The method of claim 4, wherein the number of columns is based on a difference between the number of antennas associated with the first channel of the transmitter device and a number of antennas associated with user equipment communicating with the transmitter device.

6. The method of claim 3, wherein:
generating the first set of rotational matrices comprises generating the first set of rotational matrices in a first order; and
iteratively multiplying the rotational matrices comprises multiplying the first set of rotational matrices in a second order, the second order a reverse of the first order.

7. The method of claim 2, wherein the QR decomposition comprises a Givens QR decomposition.

8. The method of claim 2, wherein the QR decomposition comprises a Householder QR decomposition.

9. A method of precoding data at a transmitter device for transmission to a corresponding user equipment, comprising:
generating, at precode circuitry, a subset of columns of a Q matrix based on a channel matrix for a channel of the transmitter device, the channel to transmit a plurality of data streams to the corresponding user equipment, the subset of columns of the Q matrix corresponding to a portion of a null space of the Q matrix and the number of columns in the subset corresponding to a number of data streams to be transmitted to the corresponding user equipment, the Q matrix representing characteristics of at least one channel of the transmitter device, wherein generating only the subset of column vectors eliminates terms of the Q matrix that interfere from other channels of the transmitter device for QR decomposition;
generating, at the precode circuitry, a partial precoding matrix based on the subset of columns of the Q matrix; and
precoding data at the transmitter based on the partial precoding matrix for transmission to the corresponding user equipment via the number of data streams corresponding to the number of columns in the subset of columns of the Q matrix via the at least one channel of the transmitter device.

10. The method of claim 9, wherein generating the subset of columns of the Q matrix comprises:
generating a rotational matrix based on the channel matrix; and
generating the Q matrix based on a subset of terms of the rotational matrix.

11. The method of claim 9, wherein generating the precoding matrix comprises generating the precoding matrix based on subsets of columns of a plurality of Q matrices associated with different channels of the transmitter device.

12. A transmitter, comprising:
a plurality of channels including a first channel, the first channel to transmit a plurality of data streams to a corresponding user equipment; and
precode circuitry configured to:
generate, for the first channel a first partial precoding matrix, the generating comprising:
generating only a subset of column vectors of a Q matrix for QR decomposition, the Q matrix representing characteristics of one or more of the plurality of channels and the number of columns in the subset corresponding to a number of data streams to be transmitted to the corresponding user equipment, wherein generating only the subset of column vectors eliminates terms of the Q matrix that interfere from other channels of the transmitter for QR decomposition;
generating the first partial precoding matrix based on the subset of column vectors of the Q matrix;
precode, based on decomposition of the first partial precoding matrix, first data for transmission via the first channel; and
the first channel to transmit the first precoded data via the number of data streams corresponding to the number of column vectors in the subset of column vectors via the first channel at the transmitter.

13. The transmitter of claim 12, wherein the precode circuitry is to generate the subset of column vectors of the Q matrix from a null space of the Q matrix.

14. The transmitter of claim 12, wherein the precode circuitry is to generate the subset of column vectors by:
generating a first set of rotational matrices based on a first channel matrix for the first channel; and
iteratively multiplying rotational matrices of the first set of rotational matrices to generate the subset of columns, wherein each iteration comprises multiplying only a subset of terms of each of the rotational matrices.

15. The transmitter of claim 14, wherein the precode circuitry is to iteratively multiply the rotational matrices by multiplying the rotational matrices to generate a number of columns for the Q matrix, the number of columns based on a number of antennas associated with the first channel of the transmitter.

16. The transmitter of claim 15, wherein the number of columns is based on a difference between the number of antennas associated with the first channel of the transmitter and a number of antennas associated with the user equipment communicating with the transmitter.

17. The transmitter of claim 16, wherein:
the precode circuitry is to generate the first set of rotational matrices in a first order; and
wherein the precode circuitry is to iteratively multiply the first set of rotational matrices in a second order, the second order a reverse of the first order.

18. The transmitter of claim 13, wherein the QR decomposition comprises a Givens QR decomposition.

19. The transmitter of claim 13, wherein the QR decomposition comprises a Householder QR decomposition.

* * * * *